Patented Oct. 21, 1952

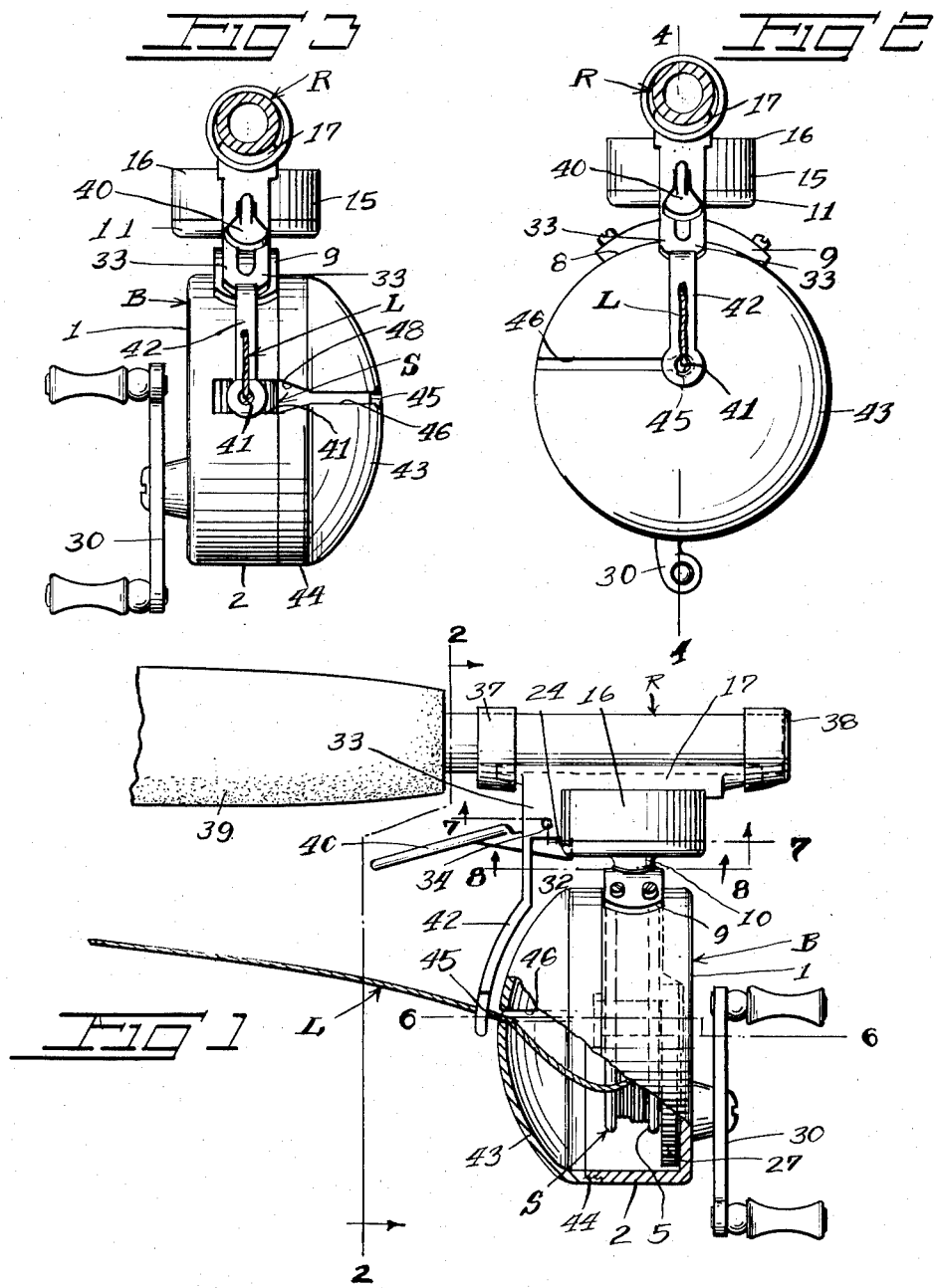

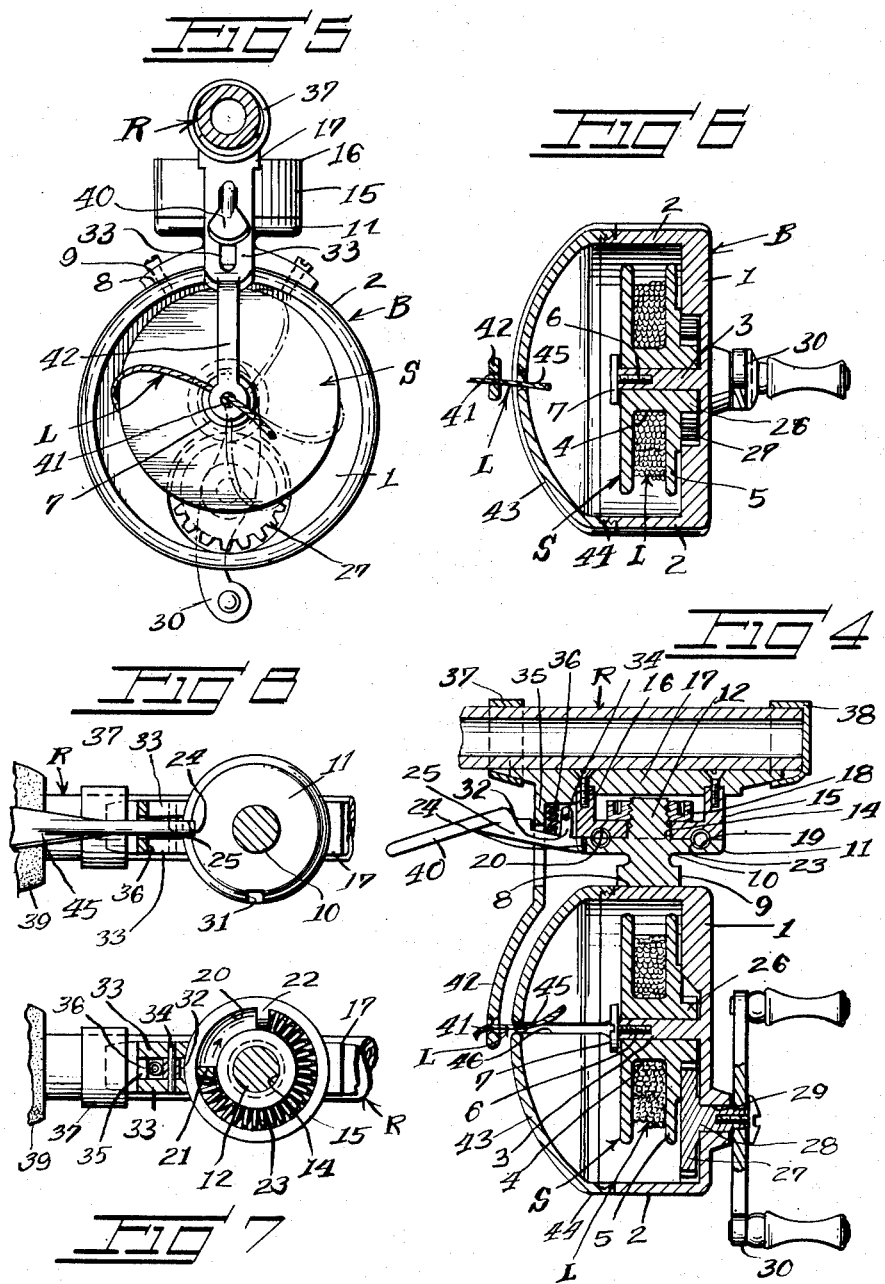

2,614,767

UNITED STATES PATENT OFFICE 2,614,767

SPINNING REEL

Charles O. Dean, Uniontown, Pa., assignor of one-third to Leslie W. Secoy, Point Marion, Pa.

Application March 11, 1948, Serial No. 14,225

1 Claim. (Cl. 242—84.1)

This invention relates to a spinning reel having for its primary object to provide a novel means for mounting the reel on a conventional fly rod which does not require change in the structure of the rod.

The invention consists in the details of construction and in the combination and arrangement of the several parts of my improved spinning reel whereby certain advantages are attained, as will be hereinafter more fully set forth.

In order that my invention may be better understood, I will now proceed to describe the same with reference to the accompanying drawings, wherein:

Figure 1 is a view in side elevation with a portion broken away of a spinning reel constructed in accordance with an embodiment of the invention and in applied position, the associated portion of the fishing rod being in fragment;

Figure 2 is a sectional view taken substantially on the line 2—2 of Figure 1 looking in the direction of the arrows;

Figure 3 is a view similar to Figure 2 but showing the reel in adjustment for retrieving;

Figure 4 is a sectional view taken substantially on the line 4—4 of Figure 2;

Figure 5 is a view similar to Figure 2 with the cover or lid removed;

Figure 6 is a sectional view taken substantially on the line 6—6 of Figure 1;

Figure 7 is a sectional view taken substantially on the line 7—7 of Figure 1; and Figure 8 is a sectional view taken substantially on the line 8—8 of Figure 1.

In the embodiment of the invention as illustrated in the accompanying drawing, B denotes a casing of desired dimensions and cylindrical in form. This casing B includes a base plate 1 and a surrounding flange 2 at the margin of the plate 1 whereby the body member is of a cup-shape type. Rigid with the base plate 1 and disposed in the same general direction as the flange 2 is a cylindrical pin or shaft 3 upon which is mounted for free rotation a spool S. This spool S as herein embodied, comprises a hub 4 and flanges 5 between which the line L winds. The spool S is held in position upon the pin or shaft 3 by the headed member 6 threading into the outer end portion of the pin or shaft 3, the head 7 of which being of sufficient diameter to overlie the central portion of the spool S. Upon removal of the member 6, the spool S may be readily removed as may be desired and more particularly when the fisherman desired to change the line L of one weight for another. In practice, the fisherman preferably includes in his equipment a separate spool for each type of line.

Rigidly secured as at 8 to the outer face of the flange 2 is a plate 9. Extending outwardly from the central portion of the plate 9, as herein disclosed integral therewith, is a short boss or neck 10 which is integral or rigid with the central portion of a flat plate 11 herein disclosed as circular in form.

The boss or neck 10 is at the axial center of the plate 11 and extending outwardly from the plate 11 and also at the axial center thereof is a threaded shank 12.

The shank 12 is freely directed through a central opening 14 of a plate 15. This plate 15 is defined by the outstanding marginal surrounding flange 16 which has close contact with an elongated securing member 17 disposed radially of the plate 15 and extending therebeyond at both extremities of the member 17.

Threading upon the portion of the shank 12 inwardly of the plate 15 is a holding nut 18 preferably of a type to be applied or removed to the instrumentality of a spanner wrench, although this is not essential. When the nut 18 is applied, the casing B has a swiveled mounting on the plate 11 to permit ready turning or swinging of the casing B upon the shank as its axis from one selected position to another as will later be more particularly referred to.

The opposed faces of the plates 11 and 15 are provided with registering annular grooves 19 and 20 respectively, one of said grooves as 19 being intersected by a lug 21 and the second groove 20 being intersected by a lug 22. Positioned within the registering grooves 19 and 20 is an expansible element 23 herein disclosed as a coil spring of requisite compression. One of the extremities of the expansible member 23 has contact with one of the lugs, as 21 with the opposite extremity having contact with the second lug 22. The element 23 is of such length and of such compression to normally maintain the lugs 21 and 22 in contact whereby the turning movement of the casing B in one direction is positively limited and normally maintained in such position by the expansible element or coil spring 23.

When the lugs 21 and 22 are in contact, a recess 24 in the peripheral portion of the plate 11 is in position to receive the end portion of a holding lever 25 whereby the casing B is held against turning or revolving movement and with the casing B in the position illustrated in Figure 3. In this position as illustrated in Figure 3, the reel is in adjustment for retrieving of the line L upon rotation of the spool S.

The hub 4 of the spool S outwardly of the inner flange 5 of the applied spool has integral therewith a surrounding gear 26 with which engages a larger gear 27. The gears 26 and 27 are preferably on a ratio one to three. The axial center of the gear 27 is provided with the integral stub shaft 28 which extends outwardly and snugly through a bearing opening 29 provided through the base plate 1 of the casing B. To the outer end portion of the shaft 28 is operatively engaged a handle of any preferred type.

When the casing B is moved from the position shown in Figure 3 to the position illustrated in Figures 1, 2 and 4, the expansible member or spring 23 is placed under further compression and when the casing B reaches the position shown in Figures 1, 2 and 4, the working extremity of the lever 25 is received within a second peripheral recess 31. The recesses 24 and 31 are preferably spaced apart ninety degrees so that when the casing B is in the position illustrated in Figures 1, 2 and 4, the axis of rotation of the spool S will be in a general direction lengthwise to the rod R to which the reel is applied and when the casing B is in the position illustrated in Figure 3, the axial center of the spool S will be substantially at right angles to the longitudinal axis of the rod R with the operating member 39, preferably at the right side of the rod.

The latch 25 in close proximity to its working end carries a laterally directed short arm 32 which extends between the outstanding spaced parallel arms 33 and pivotally held thereto by the pin 34.

The outer ends of the arms 33 are connected by the intermediate wall 35 and positioned between this wall 35 and the arm 32 is an expansible member 36 herein disclosed as a coiled spring. The placement of this member or spring 36 serves to constantly urge the working end of the latch 25 toward the peripheral edge of the plate 11 and maintain the same in contact therewith so that when the casing B moves from one desired position to another the latch 25 automatically engages within the required recess 24 or 31 to lock the casing B in such position.

When the reel is in position it is held in a conventional manner as at 37 and 38 upon the butt of the rod R outwardly of the hand grip 39 on said butt portion. The latch member 25 overlies the end portion of the elongated member 17 disposed toward the grip 39 and the latch 25 is provided with an extended finger piece 40 disposed toward the grip 39 and preferably overlying the same so that a digit of a hand grasping the grip 39 may be conveniently used to free the latch from the plate 11 and particularly when it is desired to have the casing B move from casting position to retrieving position and which movement is affected automatically under the action of the expansible member or spring 23.

As illustrated in Figures 1, 2 and 4, the casing B is in position for casting and when the cast is made the line will unwind from the spool S in a free flowing action over the outer flange 5 of the spool and during which operation the spool S does not rotate. This free flowing unwinding of the line L permits cast fishing with a light lure as it allows the throw to be for a considerable distance depending, of course, upon the weight of the line L and/or the weight of the lure.

As the line leaves the spool S it passes through a guide eye 41 positioned outwardly of the spool S and in line with the axis of rotation of the spool S. This assures the desired effective unwinding of the line L around the outer flange 5 as the line L leaves the spool.

The guide eye 41 is herein disclosed as positioned in the outer or free end portion of an elongated arm 42 rigid with the intermediate wall 35 hereinbefore referred to.

It is believed to be obvious that during the cast the line L will unwind around the outer flange 5 of the spool S at great speed with possibility of injury to a hand of a fisherman. To eliminate this disadvantage or hazard there is detachably engaged with the outer or free end portion of the flange 2 of the casing B, a lid or cover 43 herein disclosed as concave or convex with its convex surface outwardly disposed when the lid or cover 43 is applied. The marginal portion of the lid or cover 43 is defined by a surrounding flange 44 to permit the cover or lid to be threaded or otherwise operatively engaged with and held to the casing B.

The cover or lid 43, in its general central portion, is provided with an opening 45 in alinement with the opening of the eye member 41 and with the axis of rotation of the spool S. The cover or lid 43 is also provided with a slot 46 leading from the opening 45 and disposed radially of the axis of rotation of the spool S and opened at its outer end for communication with a slot 47 provided in the flange 2 of the casing B which extends transversely across the arm 42 or more particularly the eye member 41 thereof. As herein disclosed, the slot 47 is shown of a width greater than the width of the slot 46 with the side edges of the meeting portion of the slots 46 and 47 suitably beveled as at 48 to assure ready passage of the line L into the slot 46. It is to be stated that the relation just mentioned of the slot 46 and the opening 45 with respect to the guide or eye member 41 is when the casing B is in position for casting.

It is particularly noted that when the casing B is in position for casting, the slots 46 and 47 are so directed that when the casing B is released for movement into retrieving position, the line L will offer no hindrance or obstruction to such movement as the line will be within the slot during such movement.

I claim:

In a spinning reel, a cylindrical casing having an open end, means for mounting said casing for reversed quarter-turning movements on the butt of a fly-rod, a concavo-convex cover on the open end of said casing, a spool mounted for rotation within said casing, means for rotating said spool, said cover having a radial slot extending from its center to and through its edge and connecting with a longitudinal slot formed in the side wall of said casing for the passage of a line therethrough from the spool during and after the turning of the casing from one or the other of its turned positions, an arm projecting from said mounting means, a line guide eye in the free end of said arm adapted to align with one or the other of the said slots as the casing is turned from one or the other of its positions relative to the rod butt, a latching means for holding said casing in each of its turned positions of use, the said mounting means comprised in a bracket removably supported on the butt of the fly-rod, a circular plate having an annular side flange secured in abutting relation with the side of said bracket to provide a space between the plate and the bracket, said plate having a central opening, an arcuate plate secured on the outer side of the side wall of said casing, a shank projecting from the center of said arcuate plate and through the opening in said circular plate, a nut within the said space and threaded onto the free end of said shank, a flange encircling said shank at the outer side of said circular plate, said circular plate and said flange having registering annular grooves formed in the opposed faces thereof, a lug formed on said plate and intersecting the groove therein, a second lug formed on said flange and intersecting the groove in the same, a coil spring seated in said grooves and having its ends abutting said lugs, said spring normally acting to hold said lugs in abutting relation, said flange having a pair of notches in its edge spaced apart a distance equal to a quarter turn of said shank and the casing, said arm having a slotted opening adjacent its point of support on said bracket, a holding lever extending through said slotted opening and pivotally mounted therein and adapted to engage one or the other of said notches to retain the reel structure in one or the other of its positions of use, said spring acting automatically to turn said casing in one direction upon the release of said holding lever from the engaged of said notches, and a second coil spring for tensioning said holding lever engaged with one or the other of said notches.

CHARLES O. DEAN.

REFERENCES CITED

The following references are of record in the file of this patent:

UNITED STATES PATENTS

| Number | Name | Date |
|---|---|---|
| 2,034,917 | Miller | Mar. 24, 1936 |
| 2,179,413 | Kolosso | Nov. 7, 1939 |
| 2,327,469 | Teitsma | Aug. 24, 1943 |

FOREIGN PATENTS

| Number | Country | Date |
|---|---|---|
| 211,406 | Great Britain | Feb. 21, 1924 |
| 385,769 | Great Britain | Jan. 5, 1933 |
| 804,067 | France | July 27, 1936 |
| 813,087 | France | Feb. 15, 1937 |